(12) United States Patent
Selvakumaran et al.

(10) Patent No.: US 11,520,960 B1
(45) Date of Patent: Dec. 6, 2022

(54) REGISTER TRANSFER LEVEL BASED SIDE CHANNEL LEAKAGE ASSESSMENT

(71) Applicant: ANSYS, INC., Canonsburg, PA (US)

(72) Inventors: Dinesh Kumar Selvakumaran, Pflugerville, TX (US); Allen Rubin Baker, San Jose, CA (US); Norman Chang, Fremont, CA (US); Lang Lin, Cupertino, CA (US); Deqi Zhu, San Jose, CA (US); Arti Dwivedi, Santa Clara, CA (US); Preeti Gupta, San Jose, CA (US); Joao Geada, Chelmsford, MA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/201,939

(22) Filed: Mar. 15, 2021

Related U.S. Application Data

(63) Continuation-in-part of application No. 16/948,158, filed on Sep. 4, 2019, now Pat. No. 11,301,608.

(60) Provisional application No. 63/082,928, filed on Sep. 24, 2020.

(51) Int. Cl.
| | |
|---|---|
| G06F 30/3308 | (2020.01) |
| G06F 30/327 | (2020.01) |
| G06F 1/28 | (2006.01) |
| G06F 21/60 | (2013.01) |
| G06F 119/06 | (2020.01) |
| G06F 16/245 | (2019.01) |

(52) U.S. Cl.
CPC ............ *G06F 30/3308* (2020.01); *G06F 1/28* (2013.01); *G06F 21/604* (2013.01); *G06F 30/327* (2020.01); *G06F 16/245* (2019.01); *G06F 2119/06* (2020.01)

(58) Field of Classification Search
USPC ...................................................... 716/105
See application file for complete search history.

(56) References Cited

U.S. PATENT DOCUMENTS

2021/0026994 A1\* 1/2021 Tehranipoor .......... G06F 30/343

\* cited by examiner

*Primary Examiner* — Bryce M Aisaka

(74) *Attorney, Agent, or Firm* — Womble Bond Dickinson (US) LLP

(57) ABSTRACT

Methods, machine readable media and systems for performing side channel analysis are described. In one embodiment, a method, performed on a data processing system, can receive input data that contains an RTL representation of a design of a circuit and then determine, from the input data, a set of registers that store security related data during operation of the circuit, wherein the set of registers are a subset of all of the registers in the design. The method then determines, in a simulation of power consumption of the set of registers in the RTL representation, security metrics that indicate a level of potential leakage of security related data such as secret or private cryptographic keys.

20 Claims, 7 Drawing Sheets

REGISTER TRANSFER LEVEL BASED SIDE CHANNEL LEAKAGE ASSESSMENT

This application claims the benefit of and priority to U.S. provisional patent application No. 63/082,928, filed Sep. 24, 2020. This application is also a continuation in part of U.S. application Ser. No. 16/948,158, filed Sep. 4, 2020, which is incorporated herein by reference.

BACKGROUND

This disclosure relates to data security for devices, such as smart phones, credit cards, and computers.

Side channel attacks on a device, such as a smart phone or credit card or computer, can non-invasively extract sensitive information, such as cryptographic keys or passwords, from the device. There has been a proliferation of such attacks that exploit unintentional leakage through the "side channel" information which includes information derived from power supply noise (e.g., on a power grid of an integrated circuit (IC)), power consumption, electromagnetic emission, and thermal emission. For example, by measuring the dynamic voltage drop or current draw of a device while performing a large number of encryption/decryption operations, the sensitive information of the device can be learned and extracted through statistical correlation analysis. Current methods to detect these leakages during a process for designing a device rely upon hardware techniques that test the device after manufacturing the device, and these tests are performed in laboratories of certified testing services. These tests can be used to cause a redesign of an IC, but only after the IC has been fabricated.

Side channel attacks (SCA) can extract secret data from running ICs (that are using the secret data such as cryptographic keys) by measuring the physical emissions of security sensitive registers/nets or unprotected data memory. The protection of side channel leakage would require a thorough side channel leakage analysis (SCLA) of the targeted chip at multiple locations, including the power noise presented in the entire power supply network, the electromagnetic field radiation near the chip surface, as well as the temperature profile of the chip package system.

SUMMARY OF THE DESCRIPTION

This disclosure describes methods and simulation systems to evaluate side-channel leakage for register transfer level (RTL) designs. In one embodiment, information path tracing can be performed to identify security sensitive registers (SSRs) for the circuit using an RTL database setup for the design. For example, all identified registers which store a secret key (e.g. an AES-128 key or any other applicable security asset) or key related information can be classified as security sensitive registers. The hierarchical blocks associated with each of the security sensitive registers can be obtained or determined for power analysis. A simulation in the RTL design can be performed to calculate the power for the hierarchical blocks which each have one or more security sensitive registers. A side-channel analysis can be conducted on the power computed from the hierarchical blocks which have the security sensitive registers. Security metrics such as t-score, correlation coefficients, or other applicable metrics etc. can be generated to identify the leaky blocks.

A method according to one embodiment can include the following operations: receiving input data that contains a register transfer level (RTL) representation of a design of a circuit; determining, from the input data, a set of registers that store security related data during operation of the circuit, the set of registers being a subset of all of the registers in the design; and determining, in a simulation of power consumption of the set of registers, security metrics that indicate a level of potential leakage of security related data. In one embodiment, the RTL representation is a high-level cycle-accurate hardware description of the design using languages such as Verilog, VHDL and System Verilog or other hardware description languages (HDL). It does not specify logic gates for the targeted technology library. In one embodiment, the method can further include the operation of: converting the input data into an RTL design database that includes the RTL representation. In one embodiment, the method can further include the operation of: parsing an RTL design database that includes the RTL representation to identify the set of registers.

In one embodiment, the method can further include the operation of: identifying a set of one or more hierarchical blocks containing the set of registers. In one embodiment, the security metrics are computed at an RTL level of the design of the circuit and are computed for only the set of one or more hierarchical blocks that have been identified. In one embodiment, the method can further include the operation of: calculating a time-based power consumption in the simulation of power consumption for the set of one or more hierarchical blocks that have been identified. The calculated time-based power consumption can provide a representation of a power over time waveform of time-based power consumption for only the set of one or more hierarchical blocks that have been identified. This calculated time-based power consumption can include both static power consumption and dynamic power consumption. In one embodiment, the static and dynamic power consumption can be computed for only the set of one or more hierarchical blocks using the target technology library power characterization data and an activity file provided by a designer of the circuit.

In one embodiment, the method can further include the operation of: distributing different paths, between different consecutive pairs of registers in the RTL design, among different processing elements in the data processing system when identifying the set of registers in the RTL design or when simulating power consumption in the set of registers in the RTL design. This distribution of the different paths among different processing elements allows the computations to be performed independently and in parallel to greatly increase the speed of the processing, thereby improving the computational efficiency of the simulation system.

The use of these one or more methods at the RTL design level can provide information about the security metrics at an early stage of the design before a gate level design is completed. This information at an early stage can be used to decide whether to redesign portions of the design before the gate level design process is even initiated.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
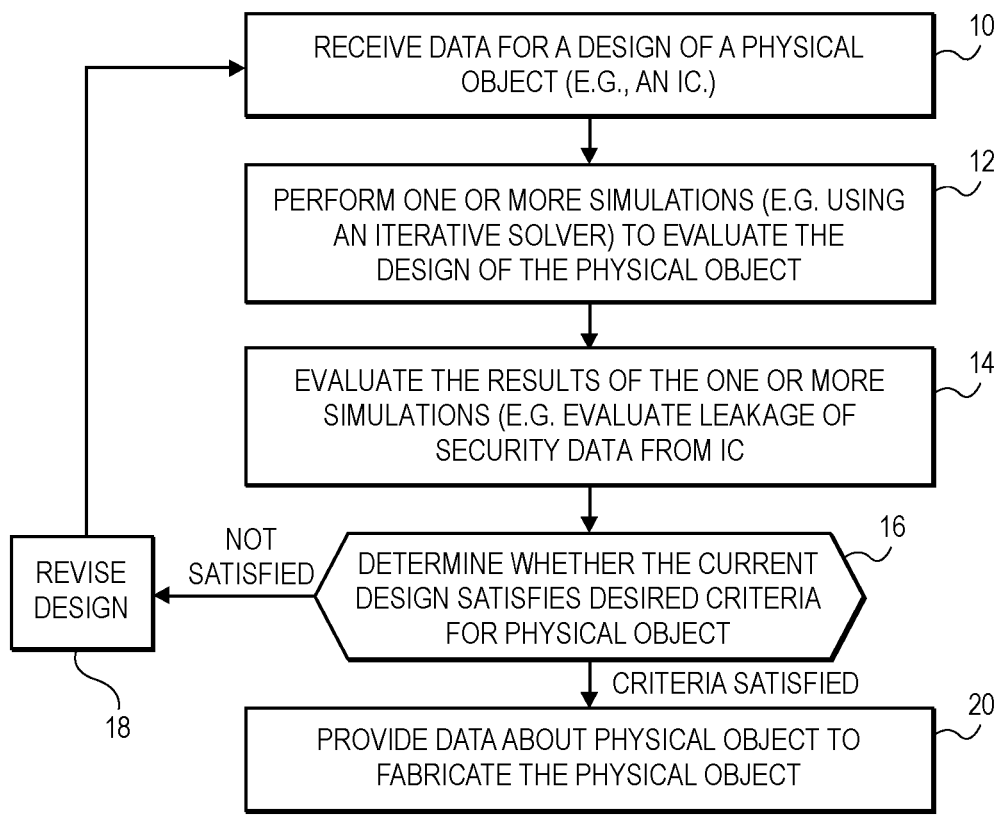
FIG. 1 shows an example of a method that can be used in one embodiment to design an electrical circuit such as an integrated circuit (IC).

The embodiments described herein can be used in simulations of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords, cryptographic keys, and other cryptographic data and sensitive data, in a device. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on dynamic current models) to evaluate the design of the IC. These simulations can use the aspects and embodiments described herein. In one embodiment, the data processing system can perform simulations by using a solver such as an iterative solver which converges upon a solution that specifies parameters relative to the IC in the simulation. In operation 14, the designer can evaluate the results of one or more simulations to determine whether the design of the IC satisfies certain desired criteria for the design. For example, a designer can determine whether it is too easy to detect the one or more keys (or other sensitive data) in the device from current results. This determination is shown in operation 16. If the one or more criteria is satisfied, then the designer in operation 20 can provide data about the circuit to allow the fabrication or manufacture of the IC or system. For example, if the one or more criteria is satisfied, one or more CAD files can be produced that describe how to build the IC or system. If the criteria are not satisfied as determined in operation 16, the designer can revise the design in operation 18 (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to sensitive data (such as cryptographic keys) by using techniques that improve the speed of simulations and reduce the computational complexity of the simulations, thereby improving the operation of a data processing system (e.g., a computer) performing the simulations and other operations. This can allow a designer of a circuit to run more simulations or produce a design more quickly and efficiently.

Figure 2A:
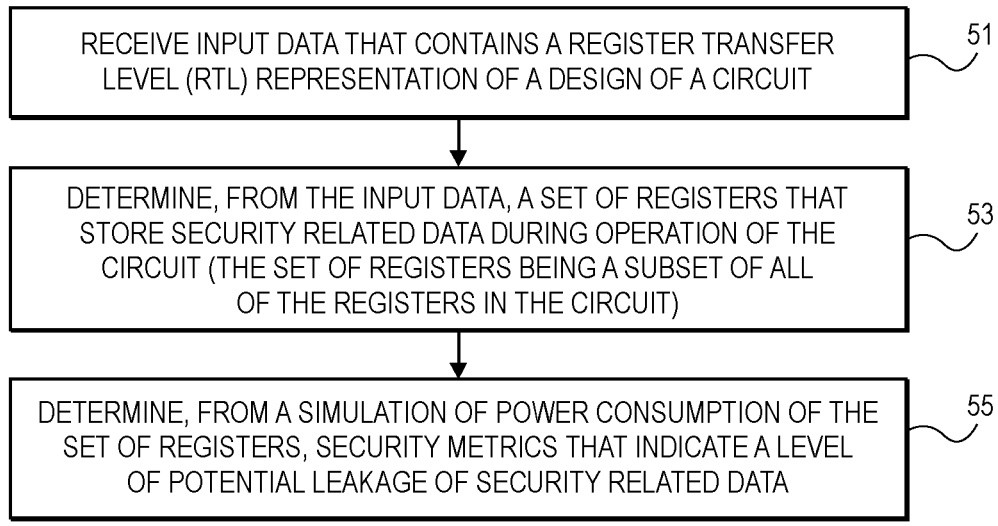
FIG. 2A is a flowchart that shows a general method according to one embodiment described herein.

A general method according to one embodiment will now be described while referring to FIG. 2A. In operation 51, a simulation system can receive input data that either includes a register transfer level (RTL) description or can be used to create an RTL description from the input data. For example, the input data can include one or more RTL Verilog files that describe and represent one or more electrical circuits such as one or more integrated circuits (ICs). The input data can also include other data that is used in one embodiment of the methods described herein to generate a security report of the design; this other data can include, for example, a list of secret assets that identify which input values are secret assets (such as secret keys used in encryption algorithms, etc.), conventional library files with power characterization data for target technology that is used for the circuit elements in the design, a conventional simulation activity file (e.g., file formats such as but not limited to FSDB and VCD) that describes switching activity of nodes in the design during operation of the design, etc. After receiving the input data, the simulation system can, in operation 53, determine from the input data a set of registers that store security related data during operation of the circuit. The determination of the set of registers in effect determines a subset of all of the registers in the circuit at the RTL level of description of the design. The set of registers which is determined in operation 53 can be referred to as security sensitive registers. This determined set of registers can then be analyzed in operation 55 to determine the level of potential leakage of security related data during operation of the circuit design. In one embodiment, operation 55 can include a simulation of power consumption of the set of registers at the RTL level during operation of the circuit. The simulated levels of power consumption can then be used to calculate security metrics that indicate a level of potential leakage of security related data. In one embodiment, operation 53 can perform an information path tracing to identify the security sensitive registers. It will be understood that the secret assets can be in various different forms or types, including, for example, passwords, account numbers, account names, hashes, keys of various different types (file keys, device keys), device identifiers, etc. It will also be understood that register transfer level descriptions of the circuit design describe the circuit by a high-level cycle-accurate hardware description of the design. It does not specify logic gates for the targeted technology library. Thus, an RTL level of description does not specify the logic gates (e. g., AND, NAND, OR, NOR, XOR, MBFF, DFF, etc.).

A more detailed embodiment of a method will now be described while referring to FIG. 2B. In operation 101 of FIG. 2B, a simulation system can receive input data such as an RTL netlist, design library files, an activity file, and a list of secret asset data. In operation 103, the simulation system can then convert the input data into an RTL design database. Then in operation 105, the simulation system can parse the RTL design database to identify security sensitive registers (SSRs) in the design. This parsing is, in effect, an information path tracing in which information (such as subkey bits of a cryptographic key) is traced through the paths in the circuit based upon connections specified in the database between the registers in the design database. FIGS. 3A and 3B provide a more detailed example of operation 105 in FIG. 2B; this more detailed example will be described further below.

Figure 2B:
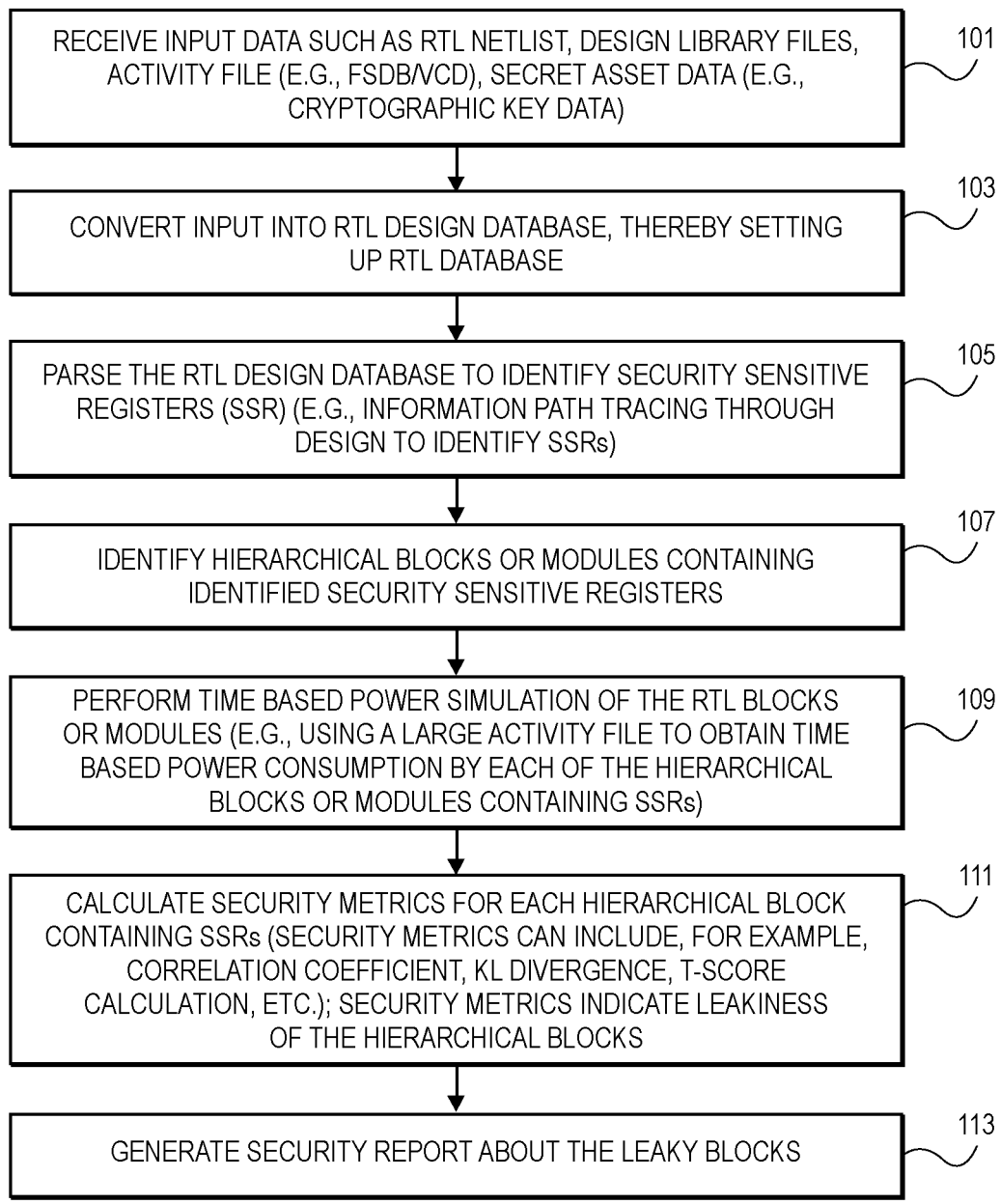
FIG. 2B is a flowchart that shows a more detailed method according to one embodiment described herein.
Figure 3A:
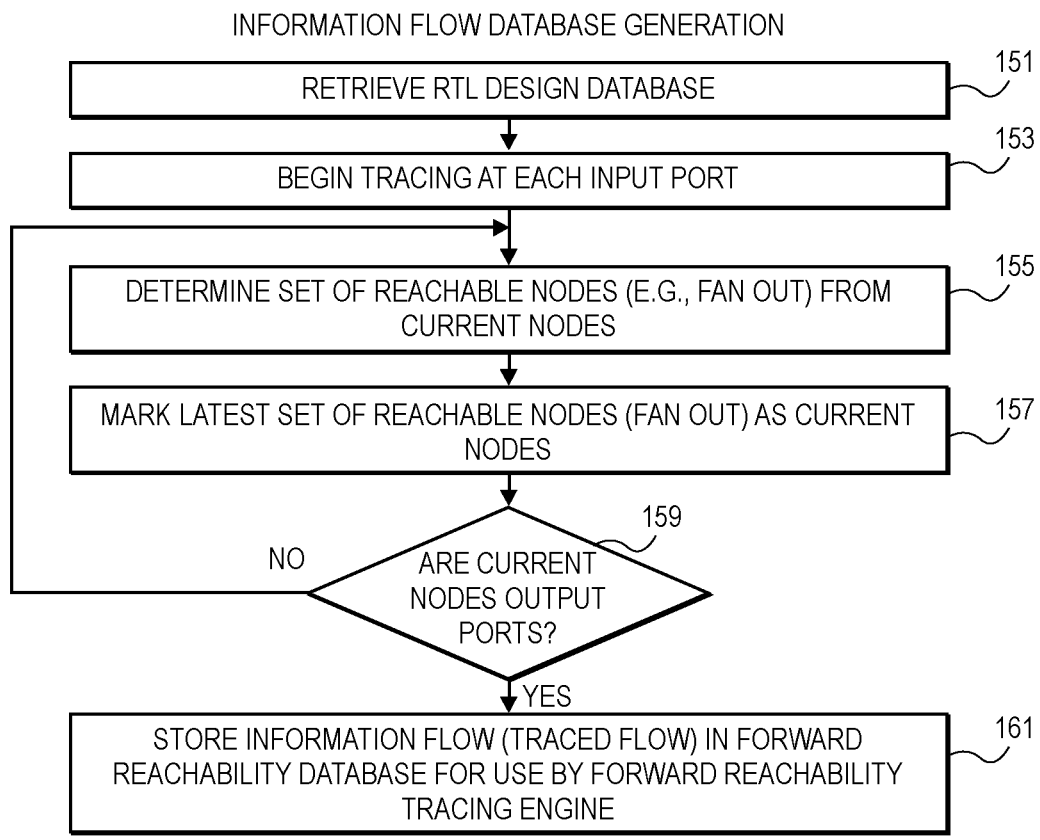
FIG. 3A is a flowchart that illustrates a method for generating an information flow database according to one embodiment.
Figure 3B:
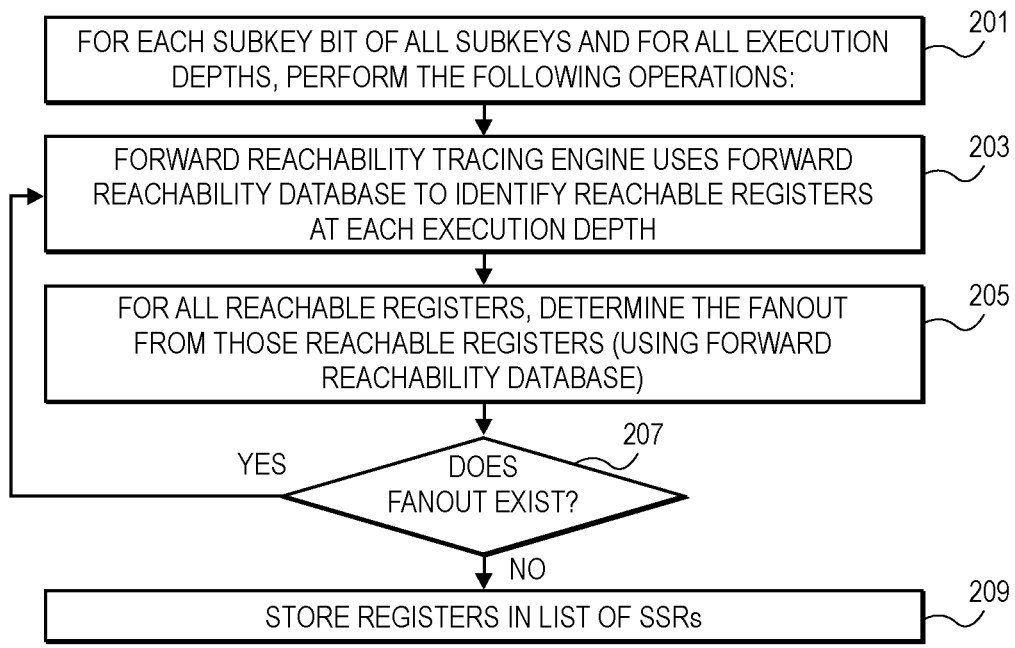
FIG. 3B is a flowchart that shows a method of using the information flow database to identify security sensitive registers according to one embodiment.

Then in operation 107 of FIG. 2B, the simulation system can identify hierarchical blocks or modules that contain the security sensitive registers that were identified in operation 105. In one embodiment, the hierarchical blocks or modules can be identified from the hierarchy present in Verilog code or other descriptions of the circuit. This allows the simulation system to exclude (in further processing operations) blocks or modules that contain no security sensitive registers, thereby allowing the simulation system to focus, in later operations of the method, on only those blocks or modules that do contain security sensitive registers. For example, operations 109, 111 and 113 in FIG. 2B can be limited to those blocks or modules which do contain security sensitive registers. In operation 109, the simulation system can perform time-based power simulation of the RTL blocks or modules (in the identified hierarchical blocks or modules) using, for example, a large activity file to obtain time-based power consumption by each of the blocks or modules containing security sensitive registers. The activity file can be used to specify how the inputs switch in time to achieve a realistic simulation of the operation of the circuit based upon the simulated switching of the inputs. Techniques known in the art to compute power consumption over time for each of the RTL blocks or modules can be used in one embodiment in operation 109. A specific example of the calculation of time-based power consumption is provided in FIG. 5 which will be described further below.

The time-based power consumption values obtained from operation 109 can then be used in operation 111 to calculate security metrics for each hierarchical block containing security sensitive registers. These security metrics can be conventional metrics used to measure potential leakage of sensitive data such as secret asset data during the operation of the circuit. The security metrics can include, for example, correlation coefficient data (see, for example, FIG. 6), KL divergence data, T-score calculations, etc. In some embodiments, these security metrics can include normalized power values and normalized power variation values that are ranked (e.g., highest leakage from highest average power values or highest variation of power values). These security metrics can be analyzed to indicate the leakiness of each of the hierarchical blocks or modules that contain security sensitive registers and also the leakiness of the security sensitive registers within each block or module along with the entire RTL design. This can allow a designer to evaluate, after this analysis, whether to redesign at least a portion of the circuit (e.g., that portion containing the very leaky blocks or modules) to reduce the leakage of sensitive data such as secret asset data. In one embodiment, the security metrics can be compiled, in operation 113, into a security report which can show a measure of leakiness in a ranked list, which can allow the designer to focus on the most leaky portions of the circuit such as the most leaky hierarchical blocks or modules that contain one or more SSRs.

FIGS. 3A and 3B will now be referred to for a description of a particular embodiment that uses a forward reachability tracing engine and a forward reachability database to identify all SSRs that process security-related data, such as cryptographic keys. Operation 105 in FIG. 2B can use the methods shown in FIGS. 3A and 3B in one embodiment. The forward reachability tracing engine uses the forward reachability database to trace through the circuit to determine all paths in the circuit that process security-related data. In operation 151, a simulation system can retrieve an RTL design database which is then processed in operation 153 by beginning the information tracing at each input port on the design. In operation 155, the simulation system determines the set of reachable nodes, which represent fan out from the current nodes. In the very beginning of this method, the current nodes are the collection of each input port and the current nodes are projected forward through the design in subsequent iterations through the method. The set of reachable nodes determined in operation 155 are then marked as current nodes in operation 157. In this manner, the simulation system incrementally advances through the design (through the fanout in a design) to identify the information flow through registers in the design. After marking the latest set of reachable nodes as the current nodes, the simulation system determines in operation 159 whether or not the current nodes are output ports. If they are output ports, then it indicates that the tracing through at least a portion of the circuit has been completed and the information flow or trace flow through the circuit can be stored, in operation 161, in the forward reachability database for use by a forward reachability tracing engine. On the other hand, if operation 159 determines that the current nodes are not output ports, then processing reverts back to operation 155 as a simulation system incrementally traces through the design; operations 155, 157 and 159 are repeated until the simulation system traces to and arrives at the output ports to produce the final information in the forward reachability database. Once the forward reachability database has been completed by the method shown in FIG. 3A, it can be used by the method shown in FIG. 3B.

As shown in FIG. 3B, the method can identify, in operation 201, all subkeys and each subkey bit for all subkeys (or other security asset data) and where they are applied as inputs. This information can be used for all execution depths in operations 203, 205, and 207. In operations 203, 205 and 207, the forward reachability tracing engine then uses each subkey bit's input to trace through the circuit to all registers that are in the path originating with each subkey bit's input. This allows the data processing system to determine those registers in the RTL design which process security-related data, and registers and nets in those paths can then be stored in operation 209 to provide a list of Security Sensitive Registers (SSR) that can be used in the other methods described herein. The method shown in FIG. 3B uses an incremental approach of moving or tracing through the paths in the repeated sequence of operations 203, 205 and 207 using the forward reachability database.

Figure 5:
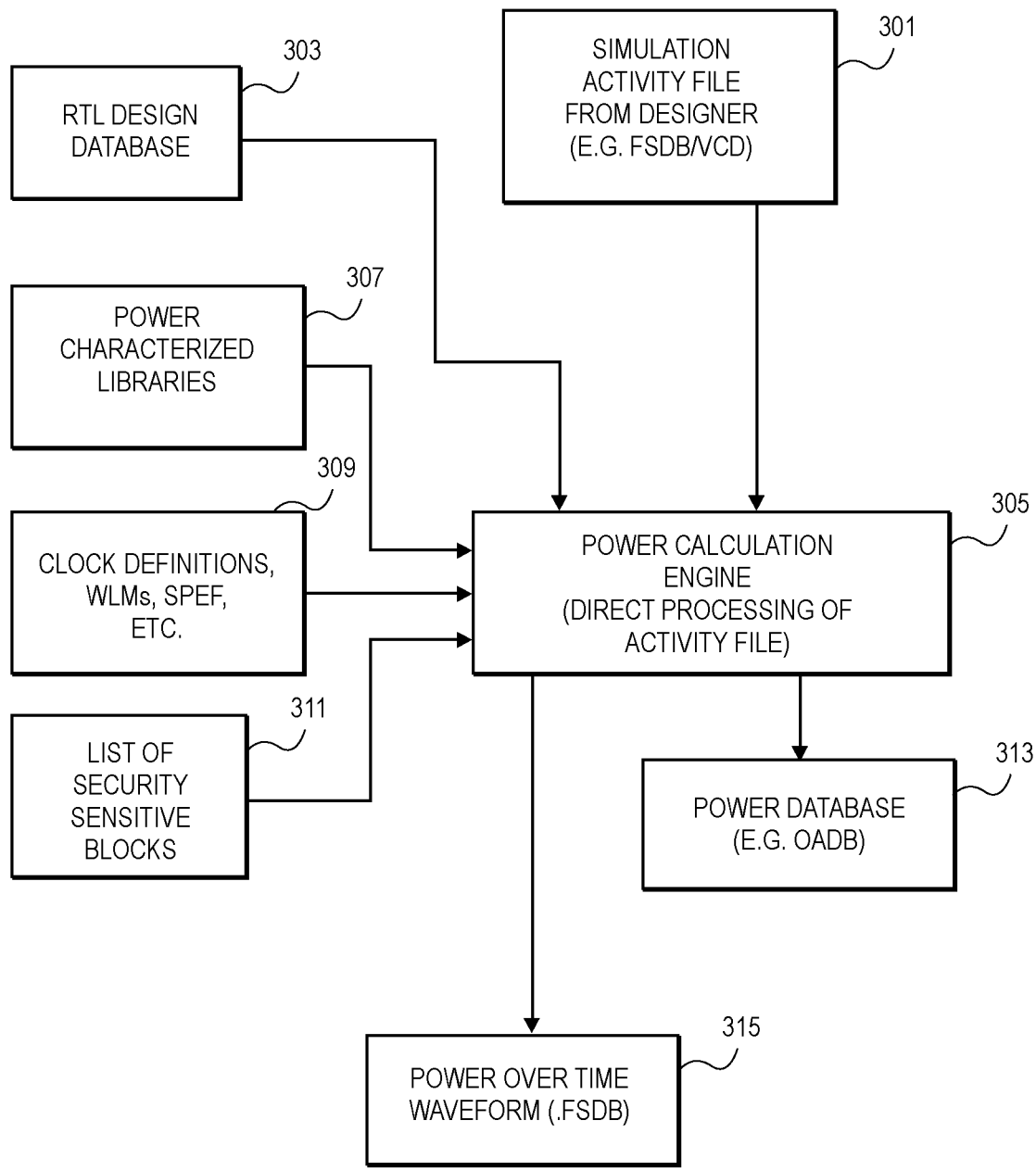
FIG. 5 shows an example of a time-based power consumption method according to one embodiment.

At least some of the embodiments described herein can use a time-based power calculation to derive power consumption values that are used to compute security metrics. FIG. 5 shows an example of an embodiment that can calculate time-based power consumption for the blocks containing SSRs, and this embodiment can be used in operation 109 in FIG. 2B. A power calculation engine 305 can receive a variety of inputs as shown in FIG. 5 to produce at least two outputs, such as the power over time waveform 315 and the power database 313. The power calculation engine can use techniques known in the art to calculate power values, such as normalized average power values and normalized power variation values and other power values known in the art that can be used to characterize their potential leakage of security related data, such as security assets. The power calculation engine 305 can receive an input from a designer such as the activity file 301 which specifies switching activity of inputs to the design in the normal operation of the circuit in the design. Another input is the RTL design database 303; thus, the power calculation engine 305 is computing power values at the RTL design stage in the design process rather than later design stages such as gate level after logic synthesis, etc. The power calculation engine 305 can also use as inputs one or more libraries about the design, such as power characterized libraries 307. The power calculation engine 305 can also use other information about the design including clock definitions, wire capacitance data in the design, SPEF data about the design, and other data shown as input 309. The power calculation engine 305 also receives a list of security sensitive blocks 311 which can also include a specific list of security sensitive registers. The list of security sensitive blocks 311 can be provided as an output from either operation 105 or operation 107. Using all of these inputs, the power calculation engine can calculate power over time at the various registers within blocks in the hierarchy to derive security metrics for selected portions of the design. The power calculation engine's output can be used to compute the security metrics in one embodiment, such as the embodiment shown in FIG. 6. The power calculation engine can in one embodiment compute both static power and dynamic power and combine them (static+dynamic power). The static power can be computed from data from the library file about the circuit in one embodiment and also use the states from the activity file. The dynamic power for each register for each activity (in the activity file) can be computed from internal power in the library and switching power from the capacitance of the load (C), the power voltage (e.g., Vdd), and the frequency of the simulation (f); in one embodiment, the dynamic power can be: $P_{dyn}=aCfVdd^2$.

Figure 6:
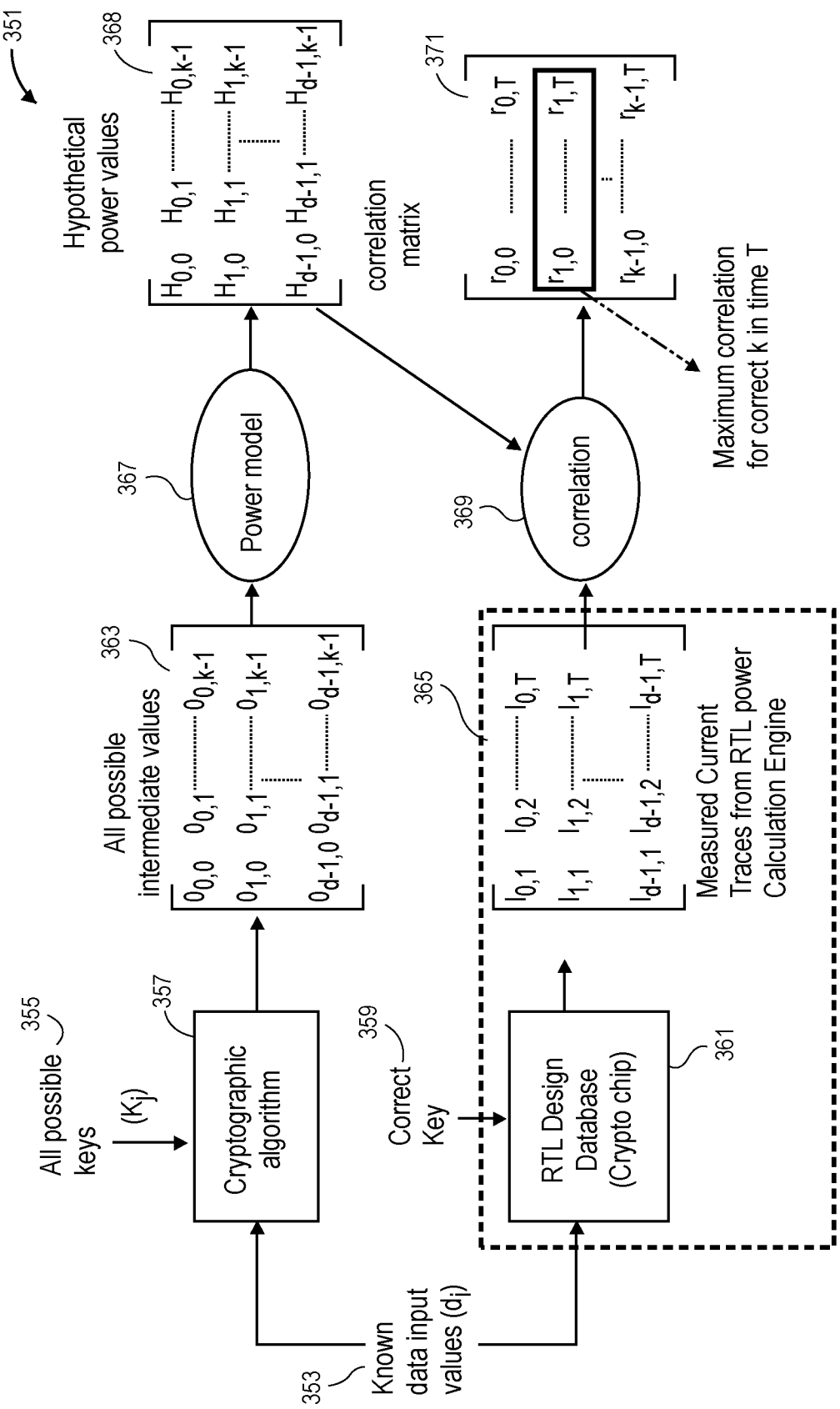
FIG. 6 shows an example of a side channel correlation power analysis that can be used with one or more embodiments.

FIG. 6 shows an example of a flow in a side channel correlation power analytics engine 351. The engine can be used for both IC level and system level side channel correlation analyses, and the flow for both can be the same. This flow can receive known data input values 353 which are known to be used in a particular cryptographic algorithm that is used in the design; for example, these known data input values can include constant values and other values used in the cryptographic algorithm. These known input data values are applied to the cryptographic algorithm 357 using all possible keys 355 to create a set of all possible intermediate values 363. These known input data values were also applied to the security netlist represented by the RTL design database 361 during the power simulation (e.g., in operation 109 of FIG. 2B or operation 55 in FIG. 2A), and this security netlist also received the correct key 359 in that simulation. The result of the simulation is a set of measured (from the simulation) dynamic power 365 over a set of cycles in time, given the sequence of cryptographic operations, and this set of measured dynamic power 365 is compared in a correlation operation 369 to the hypothetical power values 368 that were derived from the power model 367. The power model 367 can, in one embodiment, be a Hamming Distance or Hamming weight of the outputs in the set of all possible intermediate values 363. The result of the correlation operation 369 can be a matrix 371 of correlation values, which can reveal the maximum correlation for the guessed key. The absolute maximum value along a row of the matrix 371 is the guessed key. Assuming there are 100 blocks which carry the security sensitive registers, the flow in FIG. 6 will produce 100 correlation coefficients with block annotations. Note that any security metrics such as t-test, correlation of block power to global power, power variations, etc. can also be used in place of correlation coefficient.

A metric referred to as a side channel leakage score (SLS) can be defined as the ratio of (a) the correlation coefficient of the correct key to (b) the maximum correlation coefficient of the guessed key among all possible key values. In particular, SLS=(correlation coefficient of correct key)/ (maximum correlation coefficient of guessed key). If the SLS value is 1 or nearly 1, then the correct key for the given probe is revealed with fewer number of traces, which means the design is highly leaky. If the SLS is close to zero (0), then the probes are not leaky for the given number of traces. Side channel vulnerability can be defined as the correlation between the cryptographic algorithm's execution pattern and the attacker's side channel observation.

Figure 4:
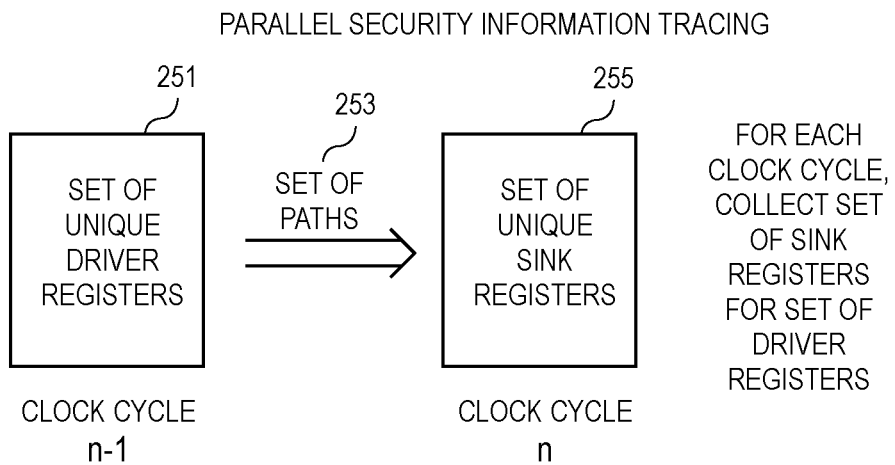
FIG. 4 shows how distributing computational resources among different paths can improve the computational efficiency of a simulation system.

One embodiment of this disclosure can use a parallel computational approach to extracting the security related paths from the circuit, and this is illustrated in FIG. 4. As the data processing system performs one of the methods in this disclosure (e.g., operation 53 in the method in FIG. 2A or operation 105 in FIG. 2B), the number of possible paths from inputs to outputs can explode making the problem intractable. One approach to reduce this burdensome explosion is to isolate paths between successive registers so that each isolated path is analyzed separately in a separate processing core. For example, as shown in FIG. 4, a set of paths can be isolated to the set of paths 253 between a set of registers 251 and a set of registers 255. The circuit containing set of paths 253, registers 251 and registers 255 also contains other sets of paths and other sets of registers not shown. These other sets of paths are also isolated and analyzed separately in other processing cores. Thus, the extraction of paths that process the security related data can use this parallel computational approach to efficiently extract the paths by distributing the processing of distinct, isolated paths between successive registers along the path among a set of processing cores. For each clock cycle, the simulation system collects a set of sink registers (at the output of paths 253) for a set of driver registers that are providing the inputs to the set of paths 253.

Figure 7:
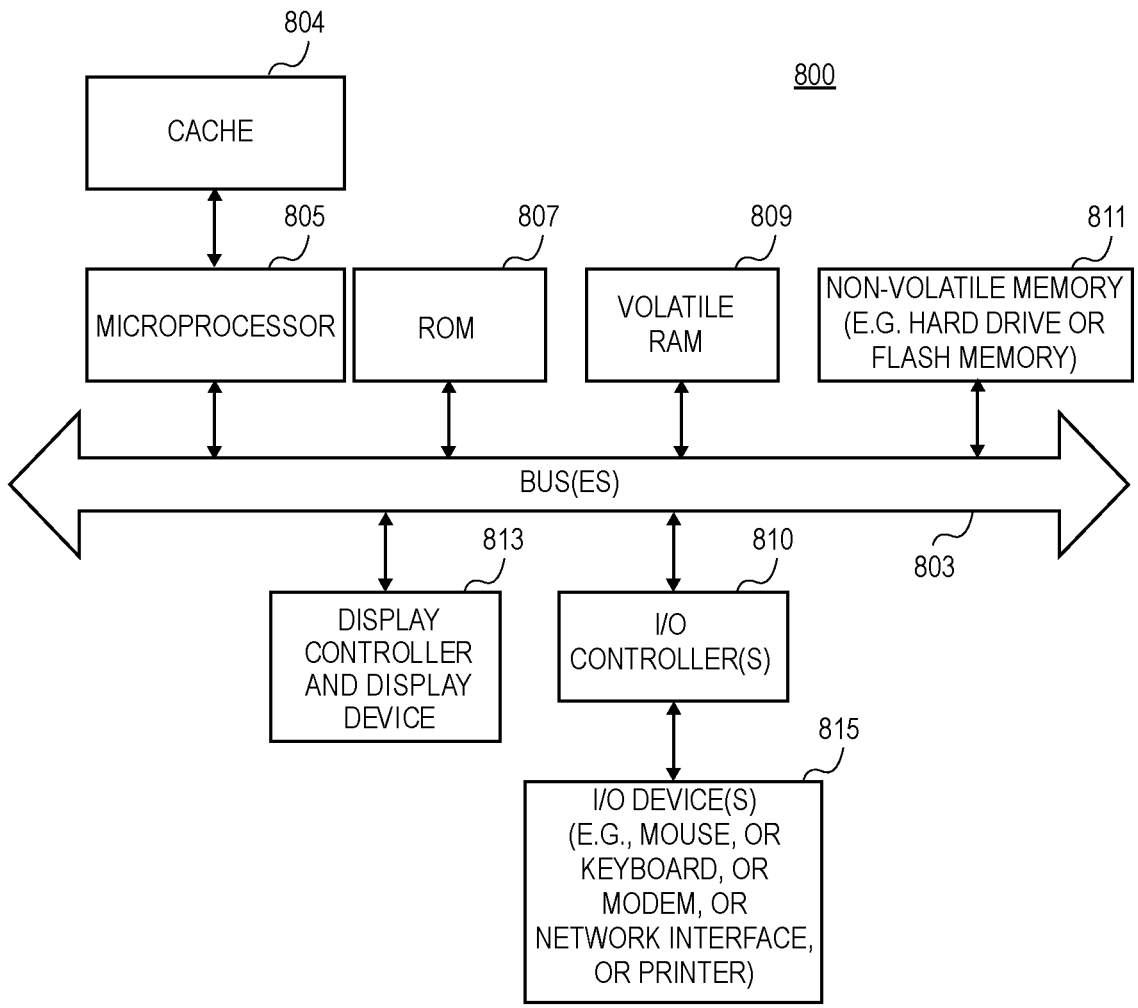
FIG. 7 shows an example of a data processing system that can be used to implement one or more embodiments described herein.

FIG. 7 shows one example of a data processing system 800, which may be used with one or more embodiments described herein. For example, the system 800 may be used to perform any one of the methods described herein such as the methods shown in FIGS. 2A, 2B, 3A, 3B and 6. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine-readable medium includes any mechanism for storing information in a form readable by a machine (e.g., a computer). For example, a non-transitory machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing executable program instructions which when executed by a data processing system cause the data processing system to perform a method comprising:
receiving input data that contains a register transfer level (RTL) representation of a design of a circuit;
determining, from the input data prior to logic synthesis that creates a gate level representation of the circuit, a set of registers that store security related data during operation of the circuit, the set of registers being a subset of all of the registers in the design;
determining, in a simulation of power consumption of the set of registers, security metrics that indicate a level of potential leakage of security related data.

2. The non-transitory machine readable medium as in claim 1 wherein the RTL representation does not specify logic gates but only a high-level cycle-accurate functional description in hardware description languages (HDL).

3. The non-transitory machine readable medium as in claim 1, wherein the method further comprises:
converting the input data into an RTL design database that includes the RTL representation created at an RTL design stage before logic synthesis.

4. The non-transitory machine readable medium as in claim 1, wherein the method further comprises:
parsing an RTL design database that includes the RTL representation to identify the set of registers that carry security sensitive information.

5. The non-transitory machine readable medium as in claim 4, wherein the method further comprises:
identifying a set of one or more hierarchical blocks containing the set of registers.

6. The non-transitory machine readable medium as in claim 5, wherein the security metrics are computed at an RTL level of the design of the circuit and are computed for only the set of one or more hierarchical blocks that have been identified.

7. The non-transitory machine readable medium as in claim 6, wherein the method further comprises:
calculating a time-based power consumption in the simulation of power consumption for the set of one or more hierarchical blocks that have been identified.

8. The non-transitory machine-readable medium as in claim 7, wherein the calculated time-based power consumption provides a representation of a power over time waveform of power consumption for only the set of one or more hierarchical blocks that have been identified.

9. The non-transitory machine readable medium as in claim 8, wherein static power consumption is computed from a library file and an activity file for only the set of one or more hierarchical blocks and dynamic power consumption is computed from the library file and the activity file provided by a designer of the circuit.

10. The non-transitory machine readable medium as in claim 8, wherein the method further comprises:
distributing different paths, between different consecutive pairs of registers in the RTL design, among different processing elements in the data processing system when identifying the set of registers or when simulating power consumption in the set of registers.

11. A machine implemented method comprising:
receiving input data that contains a register transfer level (RTL) representation of a design of a circuit;
determining, from the input data prior to logic synthesis that creates a gate level representation of the circuit, a set of registers that store security related data during operation of the circuit, the set of registers being a subset of all of the registers in the design;
determining, in a simulation of power consumption of the set of registers, security metrics that indicate a level of potential leakage of security related data.

12. The method as in claim 11 wherein the RTL representation does not specify logic gates but only their functional description coded in cycle-accurate hardware description language (HDL).

13. The method as in claim 11, wherein the method further comprises:
converting the input data into an RTL design database that includes the RTL representation created at an RTL design stage before logic synthesis.

14. The method as in claim 11, wherein the method further comprises:
parsing an RTL design database that includes the RTL representation to identify the set of registers that carry security sensitive information.

15. The method as in claim 14, wherein the method further comprises:
identifying a set of one or more hierarchical blocks containing the set of registers.

16. The method as in claim 15, wherein the security metrics are computed at an RTL level of the design of the circuit and are computed for only the set of one or more hierarchical blocks that have been identified.

17. The method as in claim 16, wherein the method further comprises:

calculating a time-based power consumption in the simulation of power consumption for the set of one or more hierarchical blocks that have been identified.

18. The method as in claim 17, wherein the calculated time-based power consumption provides a representation of a power over time waveform for only the set of one or more hierarchical blocks that have been identified.

19. The method as in claim 18, wherein static power consumption is computed from a library file and an activity file for only the set of one or more hierarchical blocks and dynamic power consumption is computed from the library file and the activity file provided by a designer of the circuit.

20. The method as in claim 18, wherein the method further comprises:
    distributing different paths, between different consecutive pairs of registers in the RTL design, among different processing elements in the data processing system when identifying the set of registers or when simulating power consumption in the set of registers.

* * * * *